Figure 1:
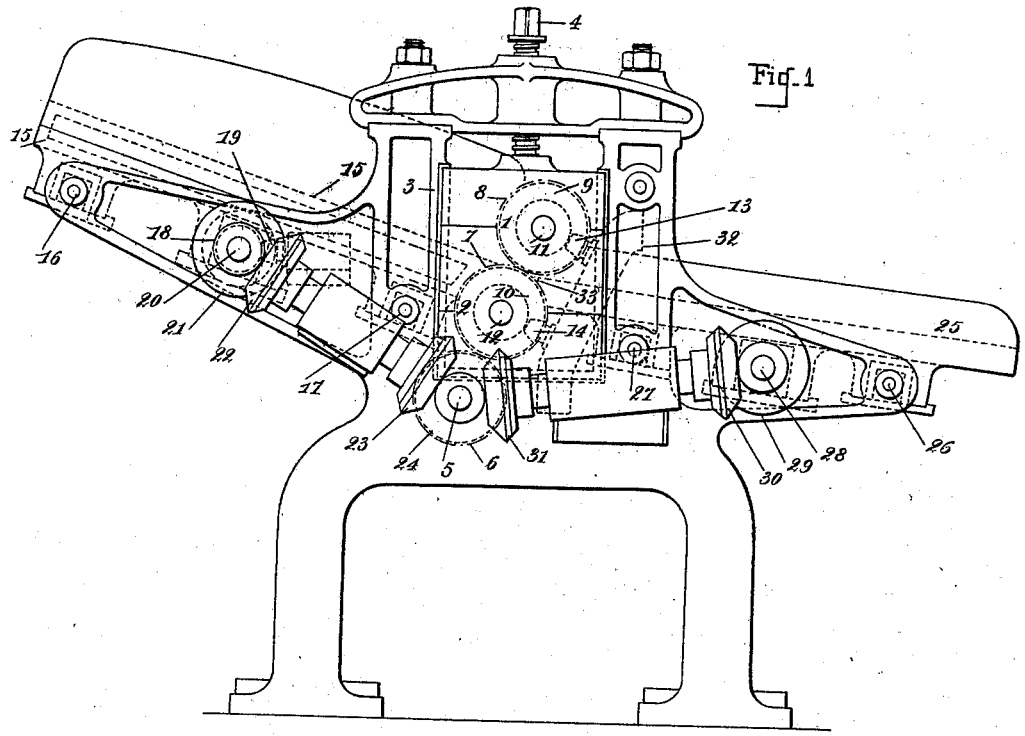

No. 671,175. Patented Apr. 2, 1901.
L. APPERT.
APPARATUS FOR ROLLING GLASS.
(Application filed June 26, 1900.)
(No Model.)

Witnesses

Inventor
Leon Appert
by Philip Mauro
his attorney

UNITED STATES PATENT OFFICE.

LEON APPERT, OF PARIS, FRANCE.

APPARATUS FOR ROLLING GLASS.

SPECIFICATION forming part of Letters Patent No. 671,175, dated April 2, 1901.

Application filed June 26, 1900. Serial No. 21,681. (No model.)

*To all whom it may concern:*

Be it known that I, LEON APPERT, a citizen of the French Republic, residing at Paris, France, have invented a new and useful Improvement in Methods of and Apparatus for Rolling Glass, of which the following is such a full and clear description as will enable others skilled in the art to make and use the same.

Under the conditions in which the manufacture of plate-glass by rolling is usually effected the lower face of the sheet of glass, which rests in contact with the table or the roller on which the rolling is effected, is only imperfectly transparent, its surface is always ridged or corrugated irregularly in consequence of the difference of temperature existing between the said table or roller and the fluid mass of glass, or the sheet of glass is roughened, (unpolished,) pitted, and, as it were, marred when this difference of temperature is small by reason of the impression made thereon by defects or faults which the surface of the said table or roller presents, however polished the latter may be at the moment of the operation.

My invention has for its object to diminish these defects and, if possible, to avoid them, and in order to attain this the mechanical apparatus intended to effect the realization must satisfy the following conditions, to wit: that at the moment of rolling the same point or any point of the fluid mass shall not be in permanent contact with the same point of the relatively cold surface of the roller or table employed for the rolling. In order to satisfy these conditions, the rolling apparatus is formed of two rollers capable of being cooled or otherwise, of as small a diameter as possible, and intended by their separation and the pressure which they exert to effect the rolling. A third roller of similar or larger diameter and formed of metal or of a suitable non-conducting material, placed in succession, is intended to receive the sheet of glass on its exit from the two first rollers and to operate the further conveyance of the same without altering or affecting the surface. This roller may be replaced by an inclined table forming a flat surface constituted under the conditions in which the roller hereinbefore mentioned is constituted and on which the sheet of glass will slide gradually as produced. In order to proceed to the rolling, the whole of these apparatuses are set in motion, as in the ordinary manufacture by rolling; but in addition during the whole duration of the operation the rotating rollers are given, respectively and individually, a transverse reciprocatory movement at right angles to the rolling movement of suitable amplitude and equal to it and in the opposite direction, having for effect to avoid a permanent contact with the mass of fluid glass before the latter is rolled and also with the glass at the very moment in which it is rolled in consequence of their slipping on its surface, such slipping being produced without carrying the glass with it. The third roller, or the table which replaces it, has a similar reciprocating movement, which must be in an opposite direction to that of the lower rolling-roller. The table, or the roller placed in front of the "rolling-out" rollers, and on which the fluid glass is poured, may be actuated so as to participate in this transverse reciprocating movement, it being also evident that each of the rollers or the table may have an independent transverse movement, so as to be able to function alone or concurrently with the other rollers. The movements of these apparatuses may be caused by mechanical means by gearings or otherwise and be interconnected or otherwise and combined with the rolling-out movement proper.

The accompanying drawings show an example of my apparatus.

Figure 2:
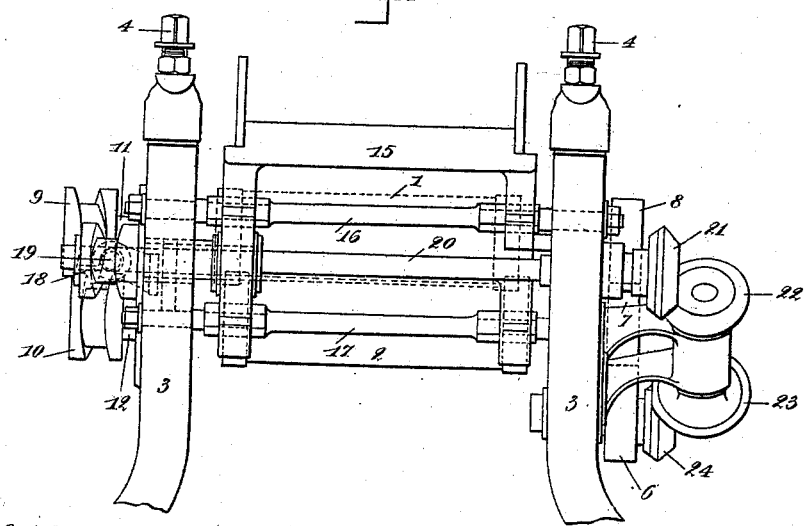

Figure 1 is a view in front elevation of a machine by which the hereinbefore-specified conditions of working may be carried out, and Fig. 2 an end view of the same from the left-hand of Fig. 1.

The same reference-numerals represent the same parts in both figures.

The rollers 1 and 2 are held in the ordinary manner in a frame having two uprights 3, and the rollers are arranged so that they may be moved apart or approached one to another by means of an ordinary system of tightening and regulating screws 4, according to the different thicknesses of the glass to be manufactured. They are also arranged so that the inclination as regards the horizon of a plane passing through their axes may in addition be varied as required. The driving of these rollers may be produced mechanically by means of gearings or the like. In the case shown in the drawings, 5 indicates the driving-shaft of the machine, actuated by a belt or directly by a dynamo. The movement is transmitted to the rollers 1 and 2 by means of pinions 6, 7, and 8. The reciprocating transverse movement is in connection with the rolling movement, and may be produced by means of grooved cams 9 and 10, fixed on the shafts 11 and 12 of the rollers 1 and 2, but at the opposite end from the pinions 7 and 8. These cams 9 and 10, which are fixed on the shafts 11 and 12, are each respectively in engagement with a fixed roller 13 14, mounted on a fixed cross-piece 32 of the machine, and thus produce a transverse displacement of the cams, and consequently of the shafts of the rollers to which they are fixed, and thereby also of these rollers themselves. A suitable arrangement of tongues and grooves must of course be provided to allow of this relative transverse displacement of the shafts and rollers, while permitting of their being carried around by the pinions 7 and 8.

In front of the rollers a casting-table 15 is arranged, having a suitable inclination necessary for the sliding of the material. Said table has a double formation, so as to allow of a suitable hot or cold liquid being circulated therein as required, and it has at the side two partitions, serving to keep the material in position. This table may slide transversely upon cross-bars 16 and 17, serving at the same time as strengthening-bars to the uprights of the frame and to receive a transverse movement or displacement by the action of a cam 18 with a roller 19, similar to the cams 9 and 10 and operated by a mechanical system of shaft and bevel-pinions 20 21 22 23 24, this last pinion being mounted on the driving-shaft 5. A similar arrangement to that hereinbefore specified must be provided to enable the bevel-pinions to remain in engagement with the shaft 20 during the transverse displacements of this latter.

The sheet of glass after having been rolled is discharged from the rolling cylinders and received upon a table 25, similar to the casting-table 15, but having a slighter inclination. This table is supported by cross-pieces 26 and 27, on which it may slide, and it may also have a transverse movement given to it by means of a mechanical arrangement of cam-shaft 28 and bevel-pinions 29 30 31 24, analogous to the one hereinbefore specified.

It is evident that the casting-tables and the tables for receiving the sheet of glass may be replaced by rollers of suitable dimensions, as has been hereinbefore specified.

The forms, proportions, dimensions, and accessory parts of my rolling apparatus may be varied and such materials be employed in its construction as may be deemed suitable.

I declare that what I claim is—

1. In apparatus for rolling plate-glass, a forming-roller, means for rotating the same, and means for imparting transverse or axial movement to said roller during its rotation.

2. In apparatus for rolling plate-glass, two juxtaposed forming-rollers, means for rotating the same, and means for imparting transverse or axial movements to said rollers during their rotation.

3. In apparatus for rolling plate-glass, two juxtaposed forming-rollers, means for rotating the same, and means for reciprocating said rollers in a transverse or axial direction during their rotation.

4. In apparatus for rolling plate-glass, two juxtaposed forming-rollers, means for rotating the same, and means for transversely or axially reciprocating said rollers in opposite directions respectively during their rotation.

5. In apparatus for rolling plate-glass, two juxtaposed forming-rollers, means for rotating same, means for imparting transverse or axial movements to said rollers during their rotation, means for receiving or supporting the plate-glass as it is delivered from the forming-rollers and means for imparting transverse movement to said receiving or supporting means.

6. In apparatus for rolling plate-glass, two juxtaposed forming-rollers, means for rotating same, means for imparting transverse or axial movements to said rollers during their rotation, a table for receiving or supporting the plate-glass as it is delivered from the forming-rollers, and means for imparting transverse movement to said receiving or supporting table.

7. In apparatus for rolling plate-glass, two juxtaposed forming-rollers, means for rotating the same, means for imparting reciprocating transverse or axial movements to said rollers during their rotation, means for receiving or supporting the plate-glass as it is delivered from the forming-rollers, and means for transversely reciprocating said receiving or supporting means in directions opposite to the reciprocation of the lower forming-roller.

8. In apparatus for rolling plate-glass, two juxtaposed forming-rollers, means for rotating the same, means for imparting transverse or axial movements to said rollers during their rotation, means for delivering the molten glass to the forming-rollers, and means for imparting transverse movement to said delivering means.

In testimony that I claim the foregoing as my invention I have signed my name in presence of two subscribing witnesses.

LEON APPERT.

Witnesses:
EDWARD P. MACLEAN,
JULES FAYOLLET.